US009285243B2

(12) United States Patent
Longtin

(10) Patent No.: US 9,285,243 B2
(45) Date of Patent: Mar. 15, 2016

(54) AUTOMATED METER READING SYSTEM AND ENERGY CONSERVATION METHOD USING SAME

(75) Inventor: Jon P. Longtin, Stony Brook, NY (US)

(73) Assignee: The Research Foundation for The State University of New York, Albany, NY (US)

(*) Notice: Subject to any disclaimer, the term of this patent is extended or adjusted under 35 U.S.C. 154(b) by 807 days.

(21) Appl. No.: 13/260,708

(22) PCT Filed: Mar. 29, 2010

(86) PCT No.: PCT/US2010/029039
§ 371 (c)(1),
(2), (4) Date: Sep. 27, 2011

(87) PCT Pub. No.: WO2010/111699
PCT Pub. Date: Sep. 30, 2010

(65) Prior Publication Data
US 2012/0022812 A1 Jan. 26, 2012

Related U.S. Application Data

(60) Provisional application No. 61/164,064, filed on Mar. 27, 2009, provisional application No. 61/307,671, filed on Feb. 24, 2010.

(51) Int. Cl.
G01R 11/06 (2006.01)
G01R 1/28 (2006.01)
G06F 1/26 (2006.01)
G06F 1/32 (2006.01)
G01D 4/00 (2006.01)
G01D 5/251 (2006.01)

(52) U.S. Cl.
CPC .............. *G01D 4/008* (2013.01); *G01D 5/2515* (2013.01); *Y02B 90/24* (2013.01); *Y02B 90/247* (2013.01); *Y04S 20/30* (2013.01); *Y04S 20/50* (2013.01)

(58) Field of Classification Search
CPC ....................................................... G01D 1/00
USPC ......... 702/43, 60, 108, 179, 183; 340/870.02; 379/106.01; 705/412
See application file for complete search history.

(56) References Cited

U.S. PATENT DOCUMENTS 4,445,087 A * 4/1984 Mehnert ........................ 324/175
4,500,779 A 2/1985 Killingsworth
(Continued)

FOREIGN PATENT DOCUMENTS

WO WO 2004044862 5/2004

OTHER PUBLICATIONS

PCT/ISA/237 Written Opinion issued on PCT/US2010/029039 (5 pp.).

Primary Examiner — Gregory J Toatley
Assistant Examiner — Felix Suarez
(74) Attorney, Agent, or Firm — The Farrell Law Firm, P.C.

(57) ABSTRACT

The present invention provides a meter retrofit and method for use thereof, utilizing a transducer with an encoder driven by a rotating shaft of a meter reading dial, the transducer including a plurality of encoder contacts surrounding a rotation axis, with each encoder contact connected to a magnetic switch. A wiper connects to the shaft and rotates around the rotation axis, sequentially contacting the plurality of encoder contacts, providing a variable signal to a monitoring device.

9 Claims, 4 Drawing Sheets

(56) References Cited

U.S. PATENT DOCUMENTS

| | | | |
|---|---|---|---|
| 4,642,634 A * | 2/1987 | Gerri et al. | 340/870.02 |
| 4,803,632 A * | 2/1989 | Frew et al. | 705/412 |
| 5,590,179 A * | 12/1996 | Shincovich et al. | 379/106.06 |
| 5,591,925 A * | 1/1997 | Garshelis | 73/862.335 |
| 6,088,659 A | 7/2000 | Kelley et al. | |
| 6,476,707 B2 | 11/2002 | Dietrich | |
| 6,982,651 B2 | 1/2006 | Fischer | |
| 7,304,587 B2 | 12/2007 | Boaz | |
| 7,940,901 B2 * | 5/2011 | Paraskevakos et al. | 379/106.01 |
| 7,973,673 B2 | 7/2011 | Payne et al. | |
| 2004/0024483 A1 * | 2/2004 | Holcombe | 700/122 |
| 2005/0179561 A1 | 8/2005 | Osterloh et al. | |
| 2006/0114121 A1 | 6/2006 | Cumeralto et al. | |
| 2007/0241930 A1 | 10/2007 | Qureshi et al. | |
| 2008/0238711 A1 | 10/2008 | Payne et al. | |

* cited by examiner

AUTOMATED METER READING SYSTEM AND ENERGY CONSERVATION METHOD USING SAME

PRIORITY

This application is a U.S. National Phase entry from and claims priority to PCT/US10/29039, filed Mar. 29, 2010, and claims priority to U.S. Provisional Application No. 61/164,064, filed Mar. 27, 2009, and to U.S. Provisional Application No. 61/307,671, filed Feb. 24, 2010, the contents of each of which is incorporated herein by reference.

BACKGROUND OF THE INVENTION

The present invention relates generally to a low-cost wireless automated utility meter reading system for real-time utility monitoring, energy usage assessment, and appliance control. In particular, the present invention provides a platform for retrofit onto extant gas, electric and water meters providing accurate, self-powered, automated measurement of usage data.

A single-family residential structure will typically have one gas and one electric meter, and may also have a water meter. Multi-unit structures have numerous gas, water and electric meters, and may also have one or more steam meters. Such meters are provided by the utility serving the structure and typically have a multi decade lifespan. Such conventional meters provide a cumulative measurement of the amount of gas, water, steam or electricity that passes through the respective meter. Based on the cumulative measurement, the responsible utility renders a bill to the customer. However, the responsible utility will typically manually read the meter once every few months, and at times will only read a meter once per year, if the customer reports verifiable meter reading at intervals therebetween.

To overcome the need to manually read the meter, U.S. Pat. No. 6,088,659 to Kelley et al., the contents of which are incorporated herein by reference, proposes an automated meter reading system. However, conventional systems such as Kelley et al. do not allow the customer to utilize such automatically collected data to confirm meter accuracy. Conventional systems also fail to provide data usable by the customer to verify efficiency of the individual appliances supplied by the meter.

To assure efficient energy usage, integration of several elements is important. A first element is to accurately measure energy that is provided, e.g. an amount of natural gas. A second element is to monitor the energy consumed by the appliances that are supplied by the meter, e.g. the boiler or furnace, hot water heater, oven and stove, and/or dryer that are connected to the gas meter. A third element is to have an ability to provide feedback to optimize energy usage.

Various solutions have been proposed in regard to the first element, such as the automated meter reading system proposed in U.S. Pat. No. 7,304,587 to Boaz, the contents of which are incorporated herein by reference. Boaz suggests a mesh communications network adapted to vary a frequency mode between a fixed frequency mode and a frequency hopping spread spectrum mode to enhance performance of collection of data from an automated meter reading network system. However, Boaz, like other conventional systems, uses proprietary hardware and dedicated networks, which are expensive, raise serious security concerns, and raise compatibility concerns, particularly if a manufacturer goes out of business.

Meter replacement needed to implement such conventional systems such as Boaz is time-consuming and expensive; particularly when a replacement meter includes electronic devices to support advanced metering infrastructure technology. Replacement can also create safety concerns. Replacing a meter requires scheduling a service shut off, removing a meter having potentially corroded fittings, connecting a new meter, leak testing and verifying proper meter installation.

In regard to the second element, conventional systems do not facilitate monitoring of the energy consumed by each specific appliance that is supplied by the meter. Rather, conventional systems aggregate appliance energy usage, effectively rendering meter data inapplicable to individual appliances.

In addition, conventional meter reading schemes do not provide real-time data needed by the customer to confirm that the meter is operating with sufficient accuracy or to utilize the meter data to confirm proper operating efficiency of the customer's own appliances. Monthly or longer reading intervals are too long to be able to provide useful feedback to the consumer to verify energy-saving habits.

Nor do conventional systems allow the user to control energy usage based on real-time measurement of energy provided to the meter compared to energy usage cycles of the appliances supplied by the meter, i.e. by comparing the first and second elements above.

SUMMARY OF THE INVENTION

The present invention overcomes the above shortcomings by providing an automated meter reading system configured as a retrofit to an existing utility meter. The present invention provides high-resolution recording of utility consumption information. The present invention operates in an open source format, without the requirement for a dedicated network or a power source permanently mounted on the meter.

The present invention provides a meter retrofit and method for use thereof having a rotating shaft that drives a meter-reading dial, by providing a transducer that includes an encoder having a plurality of encoder contacts surrounding a rotation axis, with each encoder contact of the plurality of encoder contacts being connected to varying resistive values. The transducer monitors rotations of a shaft that rotates around the rotation axis and sequentially contacting of the plurality of encoder contacts, allowing a variable signal to be sent to a monitoring device that can be connected to a feed line of the encoder. In a preferred embodiment, mechanical linkages of the meter exclusively provide power to drive the shaft and the monitoring device powers the encoder output.

In preferred embodiments, the meter is retrofit to one of a gas meter, a water meter and a steam meter.

In another embodiment, the encoder contacts are positioned at non-uniform intervals, to provide a mechanical calibration to accommodate non-constant angular shaft velocity of meter mechanical linkages that drive the shaft.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF THE PREFERRED EMBODIMENTS

The following detailed description of preferred embodiments of the invention will be made in reference to the accompanying drawings. In describing the invention, explanation of related functions or constructions known in the art are omitted for the sake of clarity in understanding the concept of the invention that would otherwise obscure the invention with unnecessary detail.

Figure 1:
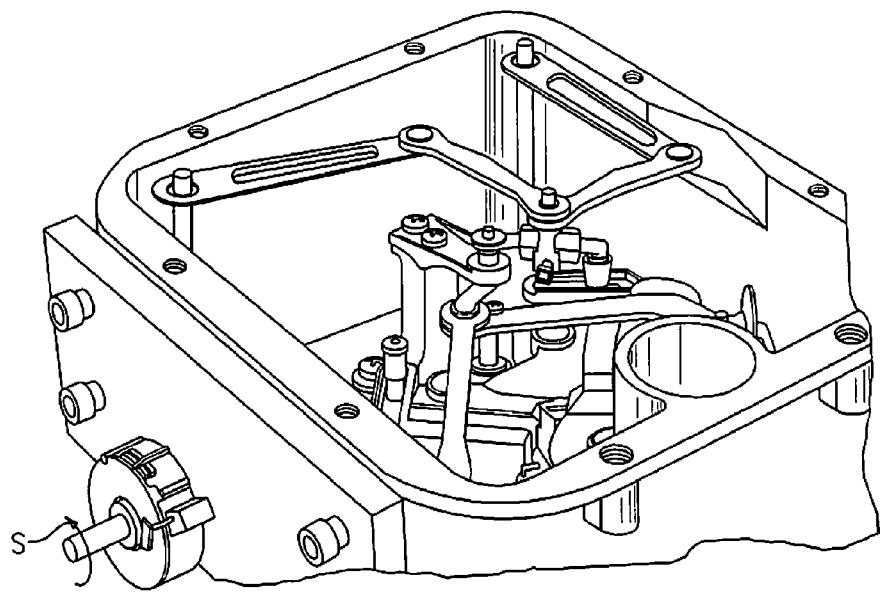
FIG. 1 is a top perspective view of a conventional gas meter with a top cover thereof removed.
Figure 2:
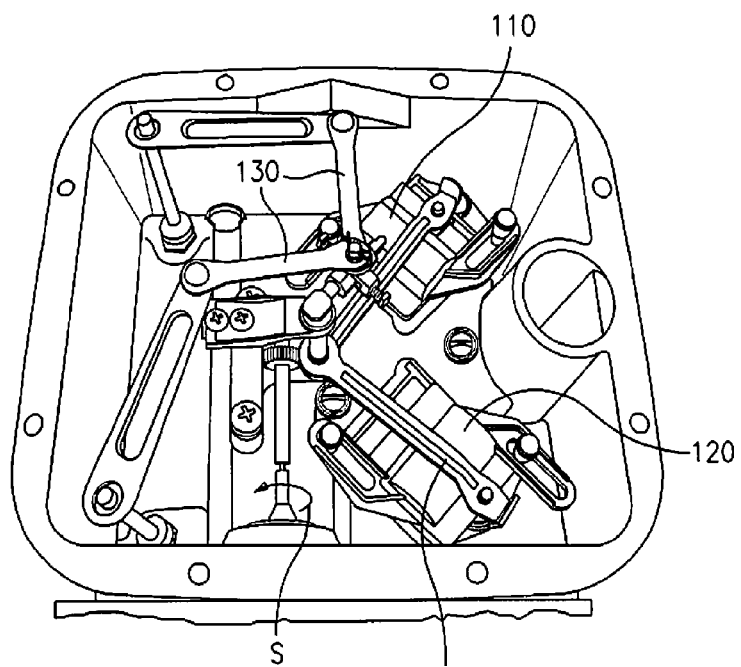
FIG. 2 is a top view of the conventional gas meter of FIG. 1.
Figure 3:
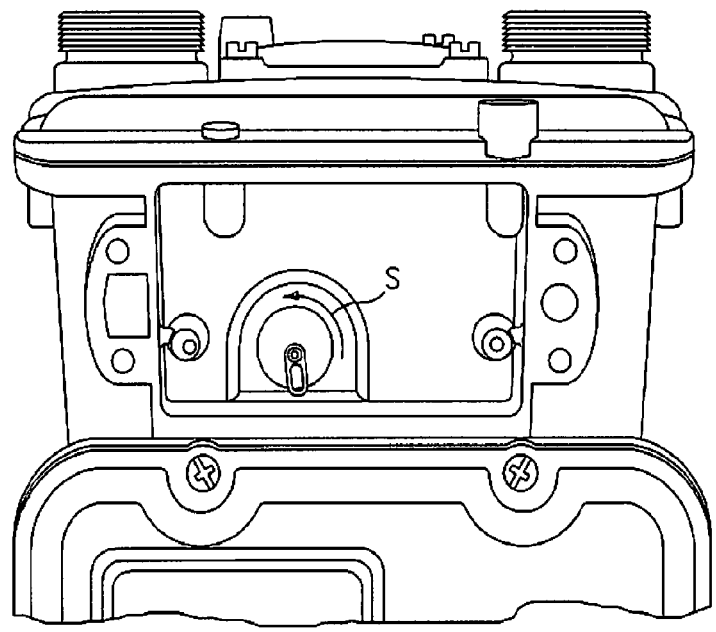
FIG. 3 is a front view of the conventional gas meter of FIG. 1, with the conventional meter reading dials removed.

As shown in FIGS. 1-3, in a preferred embodiment of the present invention, a conventional gas meter utilizes power derived from flow of the pressurized volume, e.g. gas, to move valves 110, 120 that control gas flow from a bellows to drive linkages 130 that transpose oscillatory movement of the linkages 130 into a circular movement in a shaft spin direction 'S'.

Figure 4:
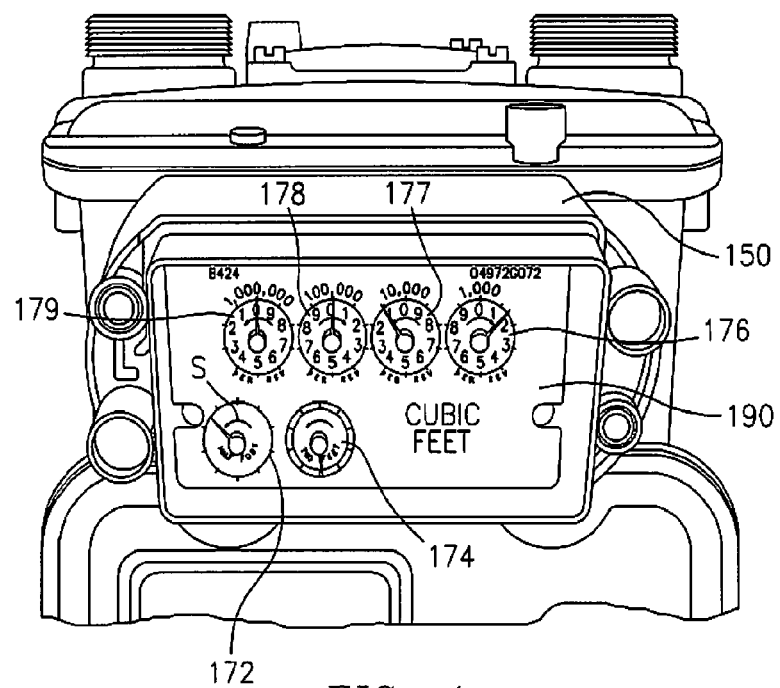
FIG. 4 is a front view of the gas meter of FIG. 3, with the conventional meter reading dials replaced, and further including a transducer of the present invention.
Figure 5:
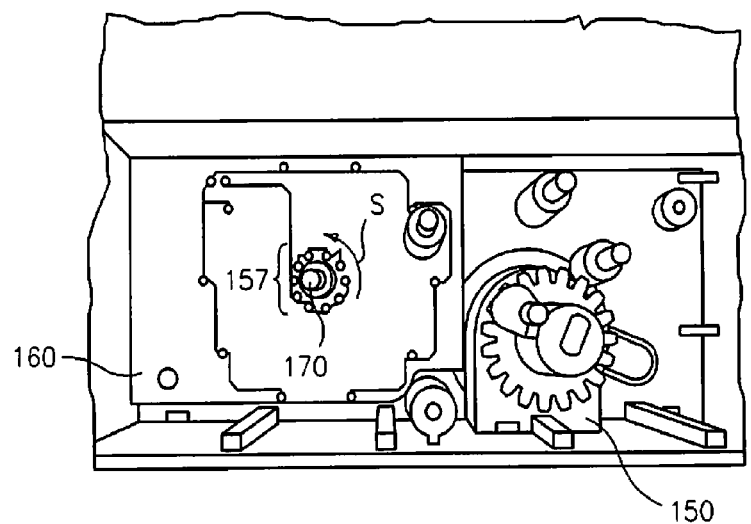
FIG. 5 is a front view of the transducer of FIG. 4, with magnetic switches of the encoder and conventional intermediate gears removed.

Transducer 150 (FIGS. 4 and 5) is retrofit between a conventional faceplate (FIG. 3) of a gas/water/steam meter and a conventional dial plate 190 (FIG. 5). Encoder 155 of the transducer 150 converts mechanical, rotational movement of shaft 170 into an electrical signal. The reassembled meter is preferably rendered tamper-resistant by conventional means, such as tags provided by the utility having unique serial numbers, as known by those of skill in the art. In addition, electrical and magnetic switches can be placed on the transducer housing to detect removal or intrusion, thus providing an additional level of security.

When assembled, shaft 170 extends through hole of a rotation axis 180 of encoder 155. Shaft 170 drives a meter reading dial 172. For clarity, the encoder 155 shown in FIG. 5 does not include the magnetic switches or intermediate gears that drive subsequent meter reading dials 174, 176, 177, 178, 179 showing higher levels of usage, e.g. the "1,000,000 cubic feet", "100,000 cubic feet", etc., than the "two foot" dial 172 driven by shaft 170, with the arrangement of the intermediate gears being known by those of skill in the art.

Figure 6:
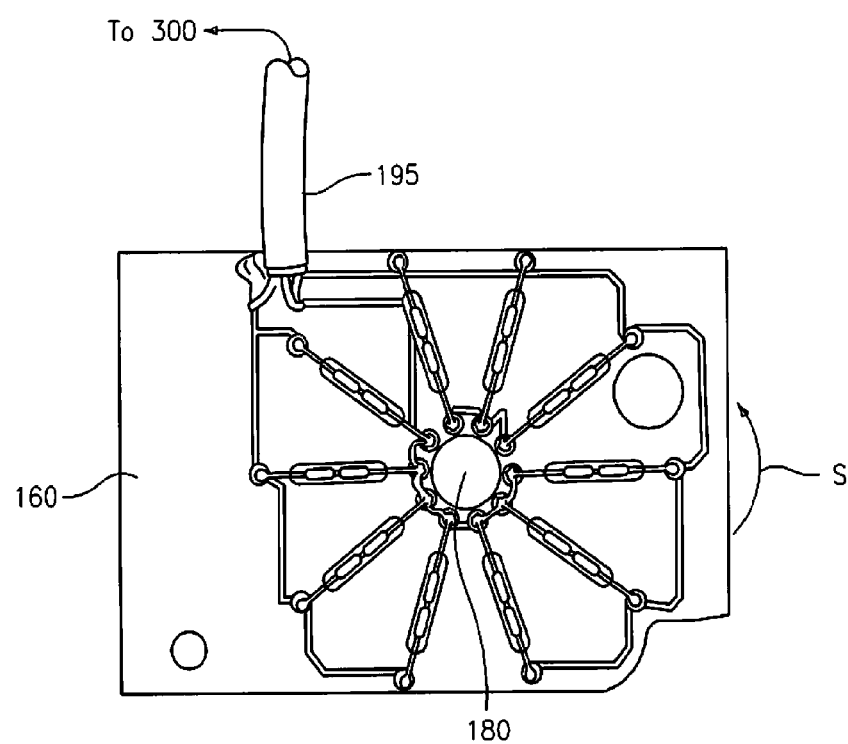
FIG. 6 shows the encoder of FIG. 5, including magnetic switches of the encoder according to an embodiment of the present invention.

FIG. 6 shows the plurality of encoder magnetic switches soldered in place and an output 195 for connecting a monitoring device 300 to the transducer. The encoder preferably senses angular position of the shaft 170 by triggering of one of a series of magnetic reed switches that are placed in a radial or star pattern around the rotation axis 180. The triggering is preferably performed via sensing of a position of a magnet on a final rotating gear that sweeps across each magnetic switch, thereby operating a reed switch therein, and releasing the switch when the magnet moves away. In a preferred embodiment, hermetically sealed magnetic switches are provided to avoid corrosion, dust and dirt, outputting a train of open-close pulses as the final gear rotates.

In another embodiment, angular position of the shaft 170 is sensed by use of a wiper that alternately contacts encoder contact contacts 157 surrounding the rotation axis 180. The function of the wiper and encoder contacts are akin to a standard potentiometer, such as disclosed in U.S. Pat. No. 6,476,707, the contents of which are incorporated herein by reference.

In a preferred embodiment, a step-up gear train is provided to increase an effective speed of shaft 170, preferably by a step up ratio of 1:360, to allow for a more exact sensing of angular position and more frequently triggering of one of the series of magnetic reed switches placed in a radial or star pattern around the rotational axis.

For meters powered by bellows-type operation of the type described above, the mechanical motion of the linkages 130 will result in a non-constant angular shaft velocity, and therefore contacting the encoder contacts at unequal times. Accordingly, in a preferred embodiment, the encoder contacts are positioned at non-uniform intervals, to provide a mechanical calibration to accommodate non-constant angular shaft velocity of the mechanical linkage.

In another embodiment of the present invention, the encoder contacts are replaced with an optical sensor and a Light Emitting Diode (LED), the output of which varies with relative position of the shaft, in the form of an optical encoder. However, powering an LED over the extended lifecycle of a gas, water or steam meter, which are mostly self-powered, may not be practical in view of the multi-year life of a utility meter. Accordingly, another preferred embodiment of the present invention provides a self-powered encoder, which connects to a data accumulator that provides a low voltage energy source to detect change of encoder position.

The encoder 155 is connected to monitoring device 300 having storage and processing capabilities. The monitoring device 300 provides a voltage that is applied across the plurality of encoder switches, the output value of which varies depending on shaft position. Accordingly, the voltage operation level is set by the monitoring device 300, which will in a preferred embodiment store volume flow rates (FIG. 7) through the meter, in addition to cumulative consumption (FIG. 8). The cumulative gas consumption 800 in FIG. 8 is shown in cubic feet.

Figure 7:
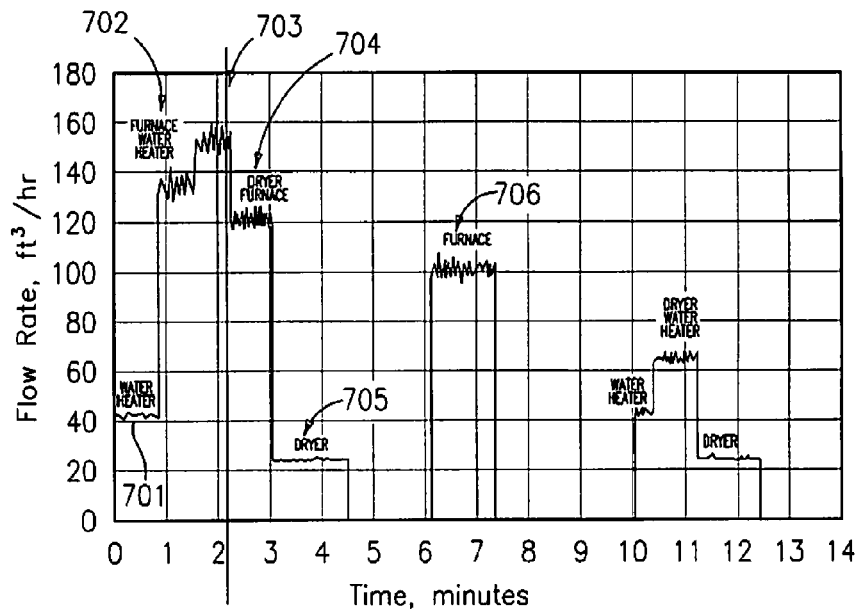
FIG. 7 is a graph of present flow rate according to an embodiment of the present invention.
Figure 8:
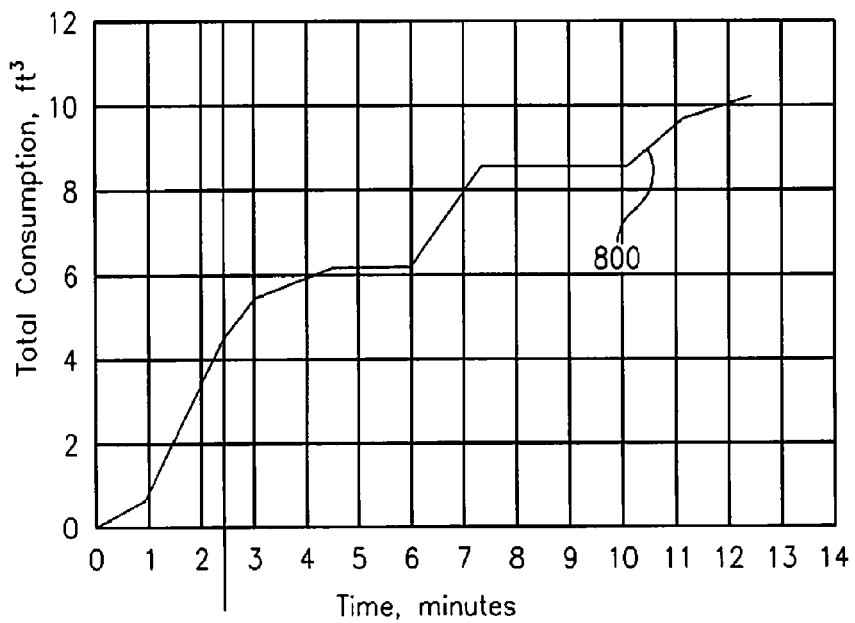
FIG. 8 is a graph showing cumulative consumption over time.

When flow rate is analyzed for each time interval, as depicted in FIG. 7, a usage profile is obtained. In a preferred embodiment, an overall usage profile is compared to individual appliance usage profiles stored in a database accessible to the monitoring device 300.

A determination is made of each appliance in operation by comparing the overall usage profile with a power consumption signature unique to the appliance. The determination is further compared with historical and manufacturer data to inform the user whether the appliance is functioning efficiently or requires replacement.

In the preferred embodiment, encoder output is stored and analyzed to identify small usage quantities, and the analysis result provides a history of operation of each appliance supplied by the meter. For example, each house will typically have many energy-consuming appliances, which can be categorized as a high-power device, a medium power device or a low-power device. In general, if there are 'N' number devices in the house that can be turned on at one time, there are 2^N different permutations of power depending on the on/off condition of each device. If N=36, there are over 68 billion different combinations are possible. Accordingly, determining the specific device that is on or off at a specific time is a daunting task. In a preferred embodiment, the devices—particularly high-power devices—are specifically identified by sensing a power consumption signature unique to the appliance, and a historic appliance usage profile is maintained for each specific high power device. If anomalies are detected over time in an appliance usage profile for a specific device, the user is provided with a 'check device' warning.

A simplified example is provided in FIG. 7 using a household having three gas powered devices; e.g. central heat, hot water heater and dryer supplied by a gas meter. For this example, N equals three, creating eight device operation combinations. The example provided in FIG. 7 is further simplified since the gas devices are powered in a binary manner, i.e. either 'on' or 'off', and are rarely half-on.

Use of the transducer of the present invention allows the appliance usage profile to be detected from the overall usage profile is shown in FIG. 7. At a first time period 701, the water heater is detected to be operating independently. At time period 702 the furnace and water heater are operating simultaneously, at time period 703 the dryer, furnace and water heater are operating simultaneously, at time period 705 only the dryer is operating, at time period 706 only the furnace operates, etc.

Comparison of individual appliance usage profiles with a total usage profile reveals a unique signature for each various combination. The database stores the appliance usage profile for comparison with future usage signatures, to confirm continued efficient operation. Monitoring energy usage in this manner allows a user to obtain an awareness of the duration that each appliance operates, and allows for output of an historical usage comparison.

Providing the user with the historical usage comparison, preferably by a wireless display device, provides the user with feedback for behavior modification, to empower the user to make energy-saving choices based on the awareness of which devices are causing the energy usage, the cost of such usage, and an indication of efficiency of each device.

Additionally, the outputted data can be compared on a real time basis to provide the user with a comparison of cost to operate their existing appliances with the cost to operate replacement, energy-efficient appliances. The output provided to the consumer preferably includes an estimated time needed to recover cost of replacement appliances, to motivate the user to upgrade to energy-efficient appliances and reduce energy consumption. This information can be provided to a wireless display viewable to the user to provide real-time usage and cost information.

Energy usage histories can also be compiled, and any anomalous trends can be detected. For example, if the furnace consumes more fuel when a current appliance usage profile is compared to the historic appliance usage profile, an output is provided to the user recommending cleaning/inspection of the furnace, to keep the appliance in peak condition and save energy. In addition, the user will preferably be provided with a report on waste usage, such as gas consumption in the middle of the night, to allow the user to adjust heat settings, improve efficiency and save money.

An additional safety benefit is provided in that the embodiment of the present invention more efficiently detects small gas system leaks, which are difficult or impossible to detect using convention low-resolution conventional meters. In addition to indicating problems with gas-burning equipment, a detected efficiency reduction can be indicative of undesirable carbon monoxide production.

While the invention has been shown and described with reference to certain exemplary embodiments of the present invention thereof, it will be understood by those skilled in the art that various changes in form and details may be made therein without departing from the spirit and scope of the present invention as defined by the appended claims and equivalents thereof.

What is claimed is:

1. An energy conservation method utilizing a meter transducer retrofit on a meter, the meter including a rotating shaft that drives a meter reading dial, the method comprising:
    measuring, by an encoder device, a volume supplied through the meter, by detecting rotation of the rotating shaft;
    obtaining, from the encoder device, a plurality of overall usage profiles of a plurality of appliances supplied by the meter, for sequential time intervals;
    comparing the plurality of overall usage profiles to historical usage profiles of each of the plurality of appliances;
    identifying each specific appliance of the plurality of appliances receiving the volume at each time interval; and
    comparing the plurality of overall usage profiles to historical usage profiles for each of the identified specific appliances,
    wherein a volume received by a specific appliance of the plurality of appliances is identified by a consumption signature or the specific appliance.

2. The method of claim 1, further comprising determining, based on the comparison result, whether the identified specific appliance is efficiently operating.

3. The method of claim 1, wherein the meter is a gas meter and a gas leak is identified when detected overall usage does not correspond to the historical appliance usage profiles of the plurality of appliances supplied by the meter.

4. The method of claim 1, wherein the meter is a water meter and a water leak is identified when detected overall usage does not correspond to the historical appliance usage profiles of the plurality of appliances supplied by the meter.

5. The method of claim 1, wherein the meter is a steam meter and a steam leak is identified when detected overall usage does not correspond to the historical appliance usage profiles of the plurality of appliances supplied by the meter.

6. A transducer comprising:
    an encoder device including a plurality of encoder contacts forming a circle with a center at a rotation axis of a shaft of a meter,
    wherein a usage monitoring prompt is provided based on measurement of a volume of gas, water or steam supplied through the meter,
    wherein the plurality of encoder contacts is configured to provide an output signal based on rotation of the shaft,
    wherein a plurality of overall usage profiles are stored for sequential time intervals,
    wherein each of the plurality of stored overall usage profiles are compared to a respective historical appliance usage profile of each of a plurality of appliances supplied by the meter,
    wherein each appliance of the plurality of appliances operating during each time interval is identified based on the comparison, and
    wherein the usage monitoring prompt is provided when a usage profile exceeds a corresponding historical usage profile during a predetermined time interval.

7. The transducer of claim 6, wherein a magnetic reed switch is provided at each of the plurality of encoder contacts to provide the output signal.

8. The transducer of claim 7, wherein the magnetic reed switches form a radial pattern around the rotation axis.

9. The transducer of claim 7, wherein the magnetic reed switches form a star pattern around the rotation axis.

* * * * *